US010132069B2

(12) United States Patent
Van Der Scheer et al.

(10) Patent No.: US 10,132,069 B2
(45) Date of Patent: Nov. 20, 2018

(54) PLASTIC INFILTRATION UNIT, A SYSTEM COMPRISING A PLURALITY OF PLASTIC INFILTRATION UNITS

(71) Applicant: Wavin B.V., CW Zwolle (NL)

(72) Inventors: Marco Van Der Scheer, Pm Klijndijk (NL); Berend Jan Van Dijk, Slagharen (NL)

(73) Assignee: Wavin B.V., CW Zwolle (NL)

( * ) Notice: Subject to any disclaimer, the term of this patent is extended or adjusted under 35 U.S.C. 154(b) by 0 days.

(21) Appl. No.: 15/511,927

(22) PCT Filed: Sep. 18, 2015

(86) PCT No.: PCT/EP2015/071461
§ 371 (c)(1),
(2) Date: Mar. 16, 2017

(87) PCT Pub. No.: WO2016/042140
PCT Pub. Date: Mar. 24, 2016

(65) Prior Publication Data
US 2017/0292259 A1    Oct. 12, 2017

(30) Foreign Application Priority Data

Sep. 19, 2014 (NL) .................................... 1040958

(51) Int. Cl.
*E03F 1/00* (2006.01)
*E03F 5/10* (2006.01)

(52) U.S. Cl.
CPC ............. *E03F 1/002* (2013.01); *E03F 1/005* (2013.01); *E03F 5/101* (2013.01); *Y02A 10/33* (2018.01); *Y02A 20/408* (2018.01)

(58) Field of Classification Search
CPC combination set(s) only.
See application file for complete search history.

(56) References Cited

U.S. PATENT DOCUMENTS 6,694,672 B1 *  2/2004  Hergeth ................ E01C 13/083
                                                          47/65.9
2003/0188505 A1 * 10/2003 Marshall ................ E01C 3/006
                                                          52/606

(Continued)

FOREIGN PATENT DOCUMENTS

DE   10 2009 004 915 A1   7/2010
EP       0 734 478 B1     6/1995
(Continued)

OTHER PUBLICATIONS

International Search Report and Written Opinion for International Application No. PCT/EP2015/071461, dated Nov. 5, 2015, 10 pages.

(Continued)

*Primary Examiner* — Kyle Armstrong
(74) *Attorney, Agent, or Firm* — Wolf, Greenfield & Sacks, P.C.

(57) ABSTRACT

There is provided a plastic infiltration unit comprising: a top deck which extends in a plane, at least one pillar extending from the top deck for supporting the top deck, wherein the top deck is provided with at least one integrated connector arranged to connect the plastic infiltration unit with another at least one integrated connector, of another plastic infiltration unit in a side by side arrangement.

27 Claims, 10 Drawing Sheets

(56) References Cited

U.S. PATENT DOCUMENTS

| | | | |
|---|---|---|---|
| 2005/0155285 A1 | 7/2005 | Urban et al. | |
| 2007/0274776 A1* | 11/2007 | Urriola | E01C 9/004 403/364 |
| 2008/0044231 A1 | 2/2008 | Roelfsema | |
| 2008/0166182 A1* | 7/2008 | Smith | E03F 1/005 405/36 |
| 2009/0250369 A1* | 10/2009 | Guibert | E03F 1/002 206/507 |
| 2012/0141203 A1 | 6/2012 | Gooden | |
| 2012/0255624 A1* | 10/2012 | Canney | E02B 11/005 137/315.01 |
| 2013/0284750 A1 | 10/2013 | Takai | |
| 2017/0292260 A1 | 10/2017 | Van Der Scheer et al. | |

FOREIGN PATENT DOCUMENTS

| | | |
|---|---|---|
| EP | 0 943 737 A1 | 9/1999 |
| EP | 1 416 099 A2 | 6/2004 |
| EP | 1 607 534 A1 | 12/2005 |
| EP | 1 607 535 A1 | 12/2005 |
| EP | 1 932 975 A | 6/2008 |
| EP | 1 997 970 A1 | 12/2008 |
| EP | 2 385 178 A2 | 11/2011 |
| EP | 2 682 534 A1 | 1/2014 |
| GB | 2 417 733 A | 3/2006 |
| KR | 10-1141308 B1 | 7/2012 |
| RU | 2373339 C2 | 11/2009 |
| WO | WO 2007/054130 A1 | 5/2007 |
| WO | WO 2011/089690 A1 | 7/2011 |

OTHER PUBLICATIONS

International Search Report and Written Opinion for International Application No. PCT/EP2015/071462, dated Jan. 28, 2016, 15 pages.

On Patentability for International Application No. PCT/EP2015/071462, dated Dec. 2, 2016, 6 pages.

* cited by examiner

PLASTIC INFILTRATION UNIT, A SYSTEM COMPRISING A PLURALITY OF PLASTIC INFILTRATION UNITS

RELATED APPLICATIONS

This application is a National Stage of International Application No. PCT/EP2015/071461, filed Sep. 18, 2015, which claims foreign priority benefits under 35 U.S.C. § 119(a)-(d) or 35 U.S.C. § 365(b) of Dutch application number NL 1040958, filed Sep. 19, 2014.

The present invention relates to a plastic infiltration unit, a system comprising a first plurality of plastic infiltration units and a second plurality of plastic infiltration units.

Plastic infiltration units are known. Infiltration units (also known as attenuation units depending on the deployment conditions of the unit) are for the temporary storage of excess rainwater, enabling controlled discharge. They are used for managing intense rainfall run-off and for reducing the risk of flooding. When the water stored in the unit is later discharged into a water impermeable system, such as a sewer, the unit may sometimes be referred to as an attenuation unit. When the stored water is later discharged into a water permeable system, such as the ground, the unit is generally referred to as infiltration units. Where reference is made in this text to an infiltration unit, it may refer to a unit suitable for attenuation (attenuation unit) and/or infiltration (infiltration unit).

Plastic infiltration units may be arranged in a planar 2 dimensional horizontal array to form a layer. The layer of plastic infiltration units may be stacked on each other so that they are arranged in a 3 dimensional array.

In order to form a layer of infiltration units, it is known to provide separate loose parts that are used to connect two or more infiltration units together. These separate loose parts must be installed manually resulting in a high cost in terms of materials and man hours. A major disadvantage with conventional systems is the time that is lost by installing the connectors. It has been found that typically, one worker in the field is occupied continuously with the installation of the additional loose connectors.

If no connectors are provided within the infiltration units in a particular, layer, as in EP 1 932 975 A, the stability, in particular, the lateral stability of the layer is severely compromised resulting in s weakened structure.

It is an object of the invention to provide a plastic infiltration unit that can be installed more efficiently and more easily, thus resulting in cost savings, without compromising the integrity of the resulting structure.

In accordance with one aspect of the invention, there is provided a plastic infiltration unit comprising: a top deck which extends in a plane, at least one pillar extending from the top deck for supporting the top deck, wherein the top deck is provided with at least one integrated connector arranged to connect the plastic infiltration unit with another at least one integrated connector, of another plastic infiltration unit in a side by side arrangement.

In this way, the units are automatically connected to each other when the unit is installed. In particular, the integrated connectors connect directly with one another as soon as the units are brought into contact with each other in a side by side arrangement. Once aligned, the units connect without requiring any substantial manipulation by personnel. Further, in this way, the total number of parts required to install a system is reduced. Further, in this way, the handling of the units is made easier. Further, in this way, a cost saving is achieved.

According to a further aspect of the invention, there is provided a system comprising a first plurality of plastic infiltration units according to any preceding claim, connectable with one another to form a first 2 dimensional array extending in a first plane, the first plurality of plastic infiltration units forming a first layer of units, the system further comprising a second plurality of plastic infiltration units according to any preceding claim, connectable with one another to form a second 2 dimensional array extending in a second plane, the second plurality of plastic infiltration units forming a second layer of units, wherein the second layer of units is stackable on the first layer of units to form a 3 dimensional array.

The invention, and various embodiments thereof, will further be explained on the basis of examples, with reference made to the drawings, in which.

Figure 1:
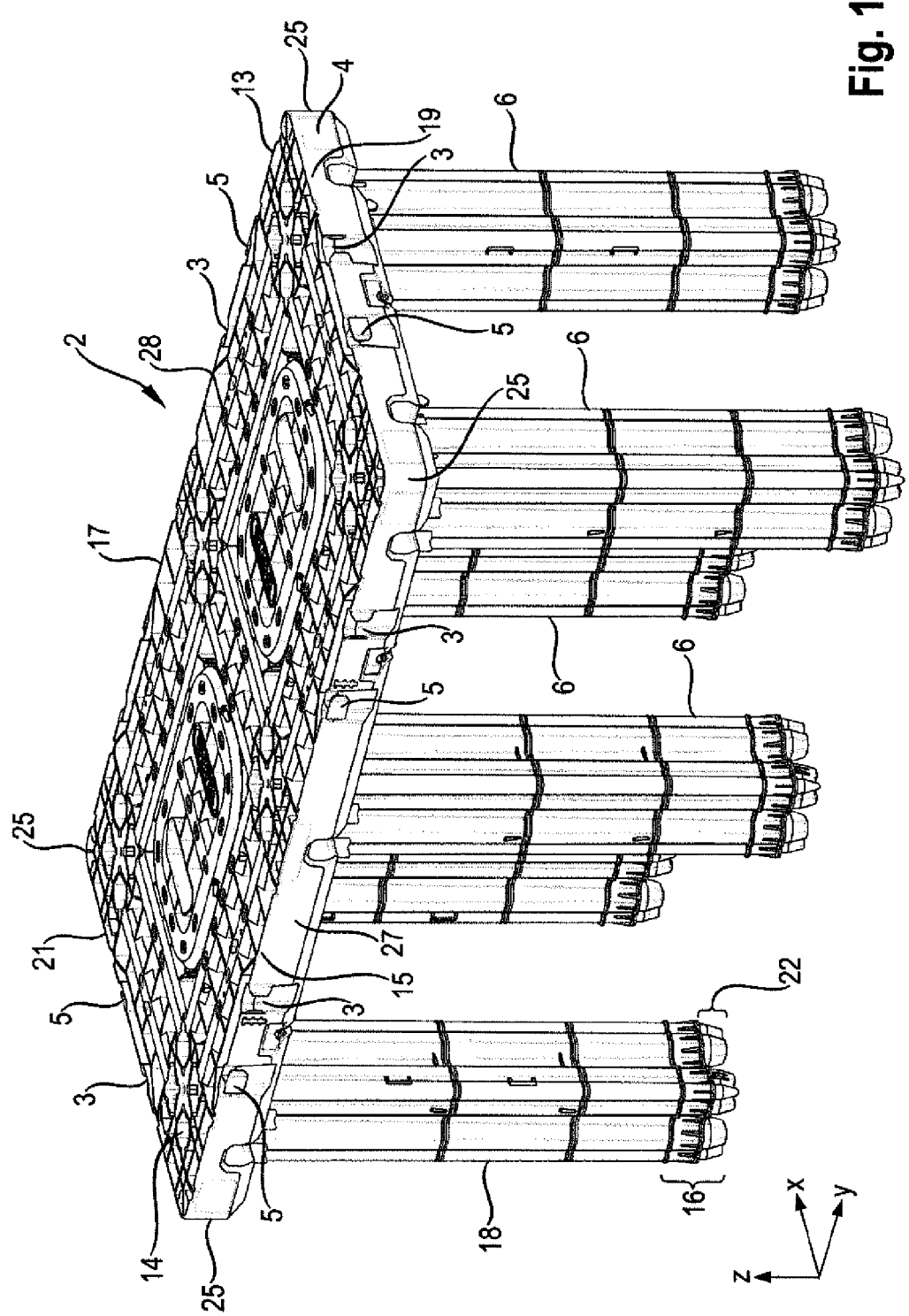
FIG. 1 shows a plastic infiltration unit according to an embodiment of the invention.

In the drawings and in the detailed description hereinbelow, like reference signs denote like features. The invention is exemplified in the embodiments described below. The invention is not limited to these embodiments, which are schematically shown.

In this disclosure reference is made to a plastic infiltration unit 2, also referred to as a (first) plastic infiltration unit 2. Reference is also made to another plastic infiltration unit 11, also referred to as a (second) plastic infiltration unit 11. Yet further plastic infiltration units, for example, third to nth plastic infiltration units may also be referred to. According to embodiments of the invention, these plastic infiltration units (first to nth) may be connected and arranged in various ways, for example, in layers and/or stacked. In embodiments, the plastic infiltration units are constructed in the same way, so that the first to nth plastic infiltration units 2, 11 are the same, that is identical. In this connection, reference is made, for example, to FIGS. 9 and 10, which show two embodiments incorporating the present invention.

Figure 2:
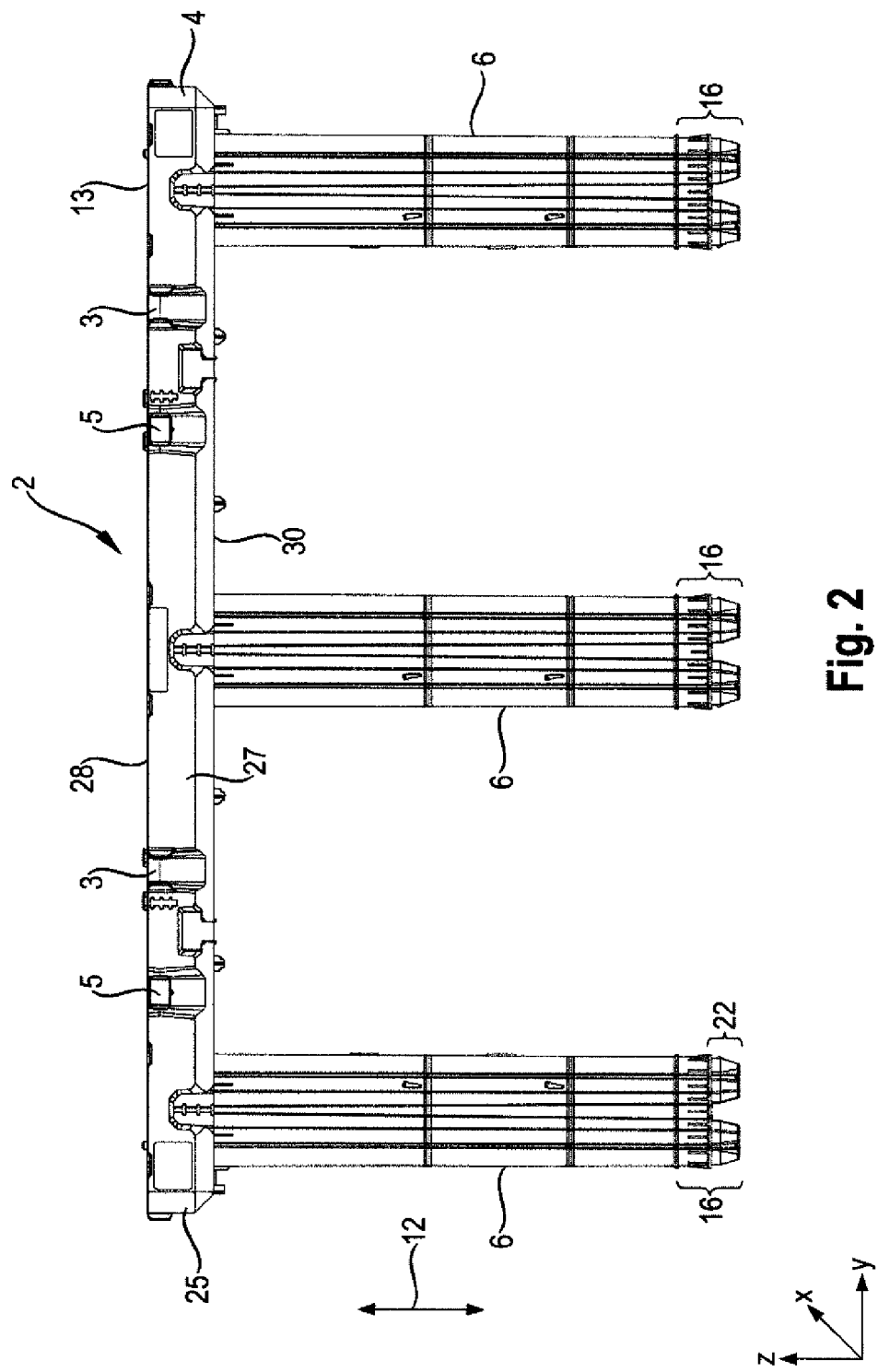
FIG. 2 shows a side view of a plastic infiltration unit according to an embodiment of the invention.
Figure 3:
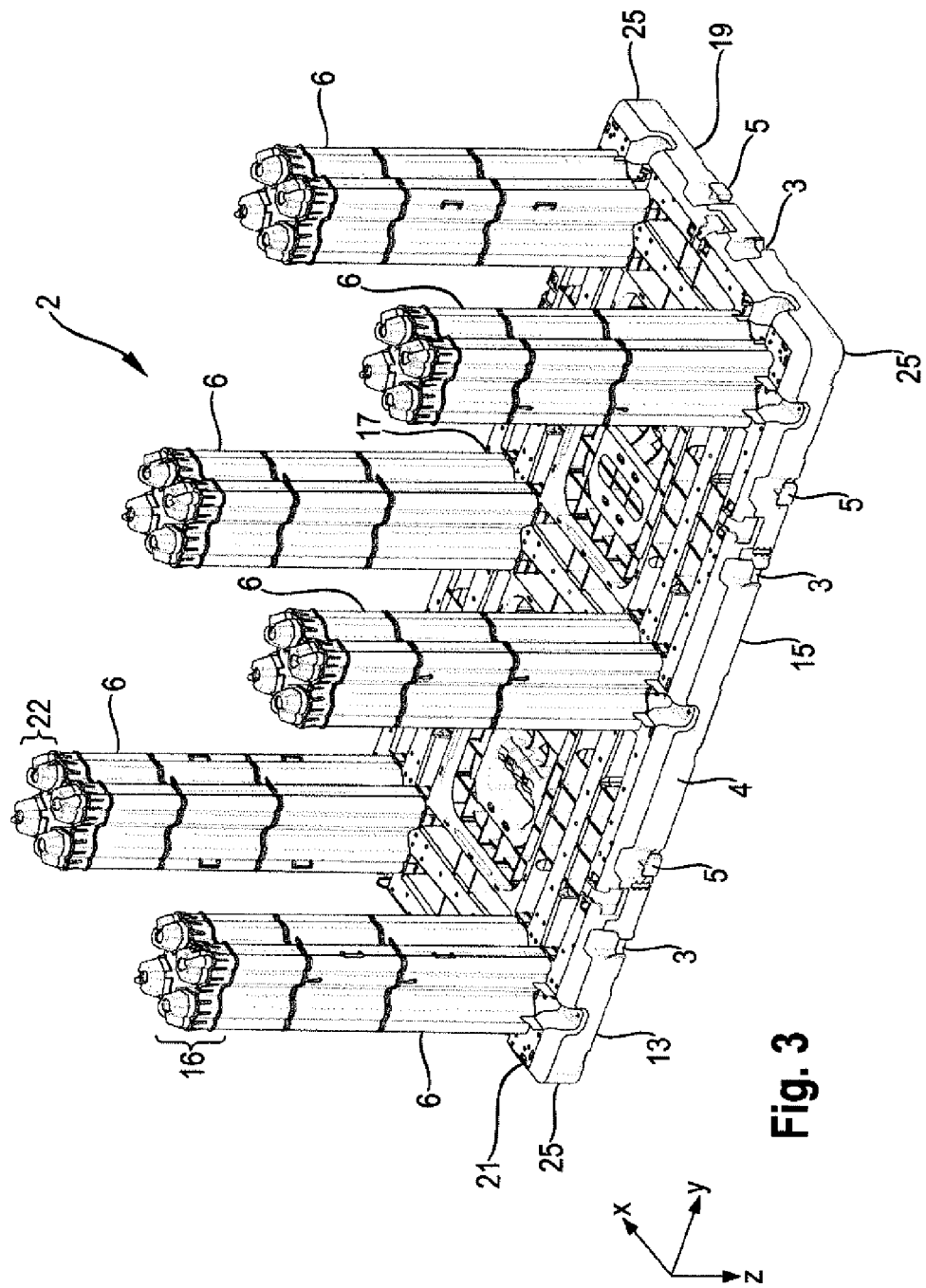
FIG. 3 shows an underside view of a plastic infiltration unit according to an embodiment of the invention.
Figure 4:
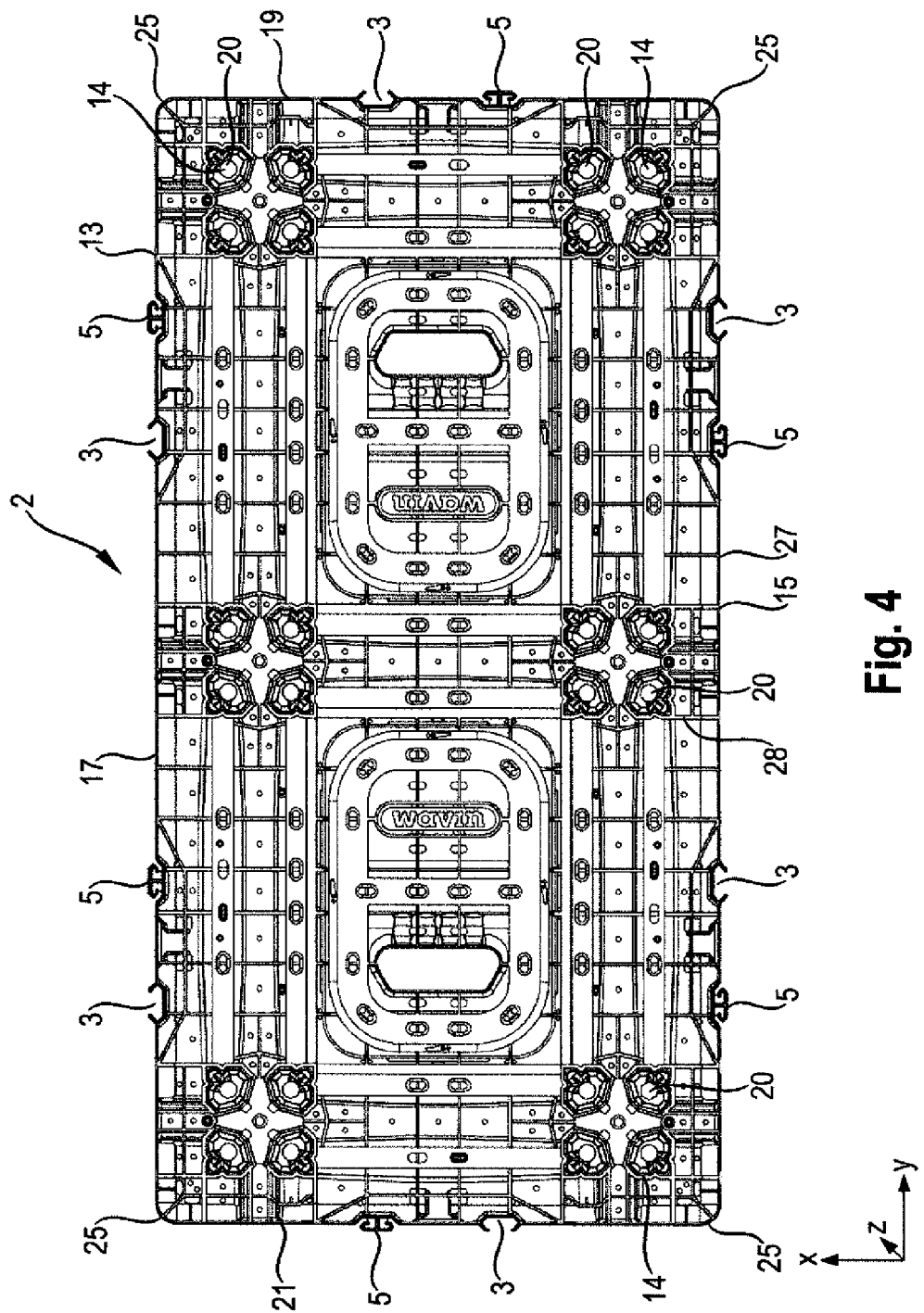
FIG. 4 shows a top view (bird's eye view) of a plastic infiltration unit according to an embodiment of the invention.

FIG. 1 shows a plastic infiltration unit according to an embodiment of the invention. FIG. 2 shows a side view of the plastic infiltration unit of FIG. 1. FIG. 3 shows an underside view of the plastic infiltration unit of FIG. 1. FIG. 4 shows a top view (bird's eye view) of a plastic infiltration unit of FIG. 1. In particular, FIG. 4 shows an upper surface of the plastic infiltration unit.

According to an embodiment of the invention, the plastic infiltration unit 2 comprises a top deck 4 and at least one pillar 6 extending from the top deck 4. The at least one pillar 6 supports the top deck 4. The plastic infiltration unit 2 is weld free. For example, it is preferably made by injection molding from thermoplastic material. The plastic infiltration unit 2 according to the invention can be produced in a single shot. In this way, an efficient manufacturing process is achieved. The top deck 4 and the at least one pillar 6 are produced in one piece. In this way, an efficient manufacturing process is achieved.

In the embodiment shown, the top deck 4 extends in a plane, for example, the xy plane shown in FIG. 1. The longitudinal direction 12 (or z direction) of the at least one pillar 6 is substantially perpendicular to the plane of the deck (the xy plane shown in FIG. 1).

The deck of a (first) infiltration unit provides a structure into which pillars of the (first) plastic infiltration unit extend from and into which pillars of another (second) plastic infiltration unit are insertable into. The pillars are provided to support a load. The load includes a load from surrounding plastic infiltration units and the load of any water. The load is transferred via the pillars also through the deck. In this specification, the deck of a plastic infiltration unit is referred to as a "top" deck. It is referred to as a top deck since the pillars of the same plastic infiltration unit extend from an underside of the deck. Therefore, when the plastic infiltration unit is deployed the deck is on the top of the pillars. The top deck of a first plastic infiltration unit, when deployed, however, may form the base for a second plastic infiltration unit disposed on top of (stacked on) the first plastic infiltration unit.

In this disclosure reference is made to a plastic infiltration unit 2, also referred to as a (first) plastic infiltration unit 2. Reference is also made to another plastic infiltration unit 2, also referred to as a (second) plastic infiltration unit 2. Yet further plastic infiltration units, for example, third to nth plastic infiltration units may also be referred to. According to embodiments of the invention, these plastic infiltration units (first to nth) may be connected and arranged in various ways, for example, in layers and/or stacked or temporarily coupled to one another for storage and/or transportational reasons.

In this disclosure, reference is further made to upper and lower surfaces, and undersides etc of the plastic infiltration unit. As mentioned above, reference is also made to a top deck. In this connection, this terminology refers to the general, relative orientation of the various features of the plastic infiltration unit when deployed.

Figure 9:
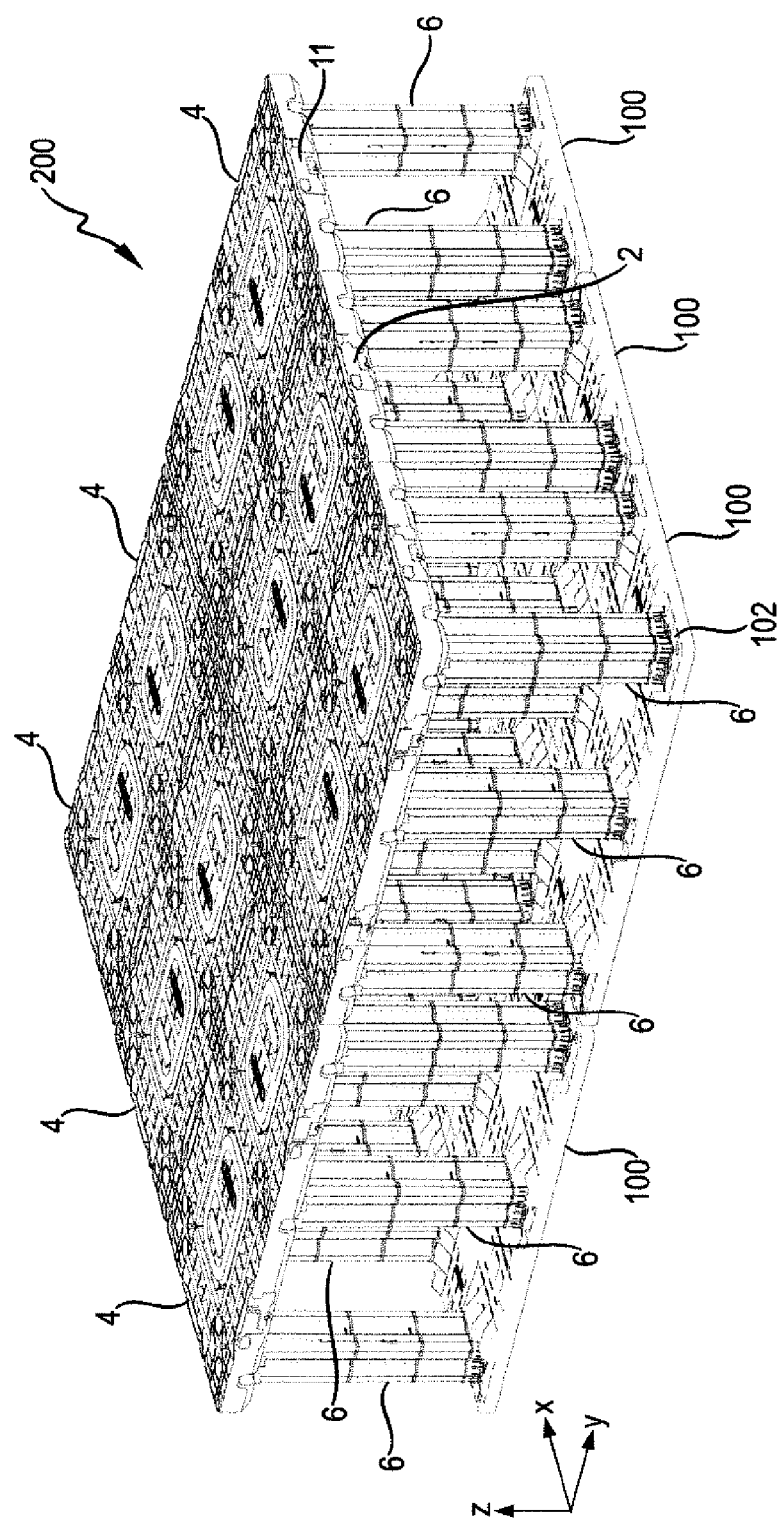
FIG. 9 shows a 2 dimensional array of plastic infiltration units connected together in accordance with an embodiment of the invention.

Further, the top deck may include an upper facing surface 28 (shown in FIGS. 1 and 2) and a lower facing surface 30 (shown in FIGS. 2 and 3). At least a part of the at least one pillar 6 extends from the lower facing surface 30, and is arranged to be connectable with an upper facing surface 28 of a second infiltration unit 2' to form a stack of infiltration units 2, as shown in FIG. 9.

In one embodiment, the pillar 6 is integratably formed in the top deck 4 so that an upper end 14 (also referred herein as the proximal end) of the pillar 6 forms a part of the top deck 4 into which a lower end 16 (also referred herein as the distal end) of a second pillar is insertable.

In the embodiment shown in FIG. 1, the unit 1 includes six pillars. Other numbers of pillars are envisaged, for example, two, three or four, or more.

Figure 6:
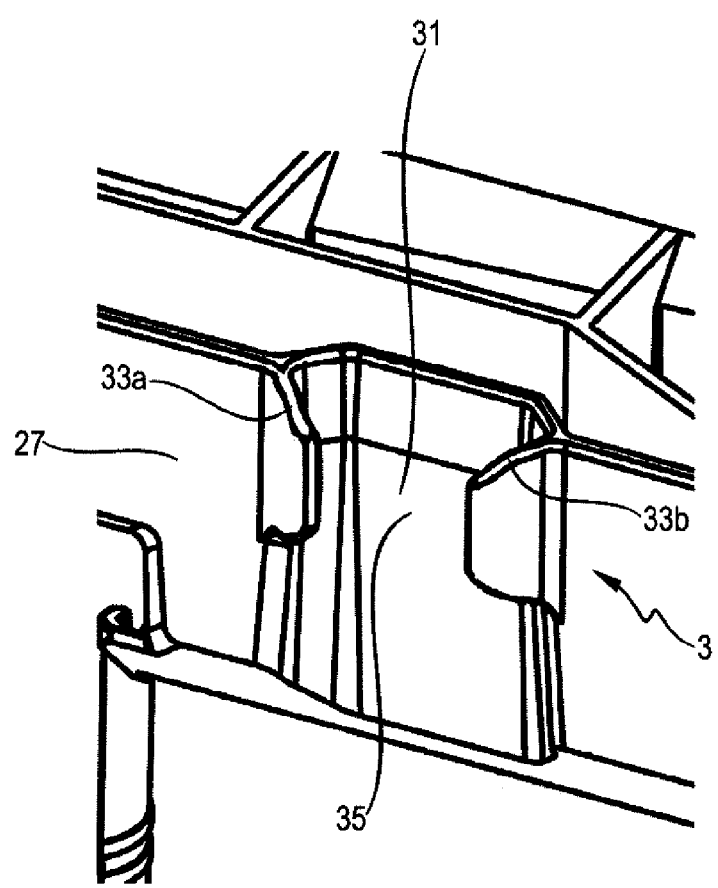
FIG. 6 shows an integrated female connector according to an embodiment of the invention.
Figure 7:
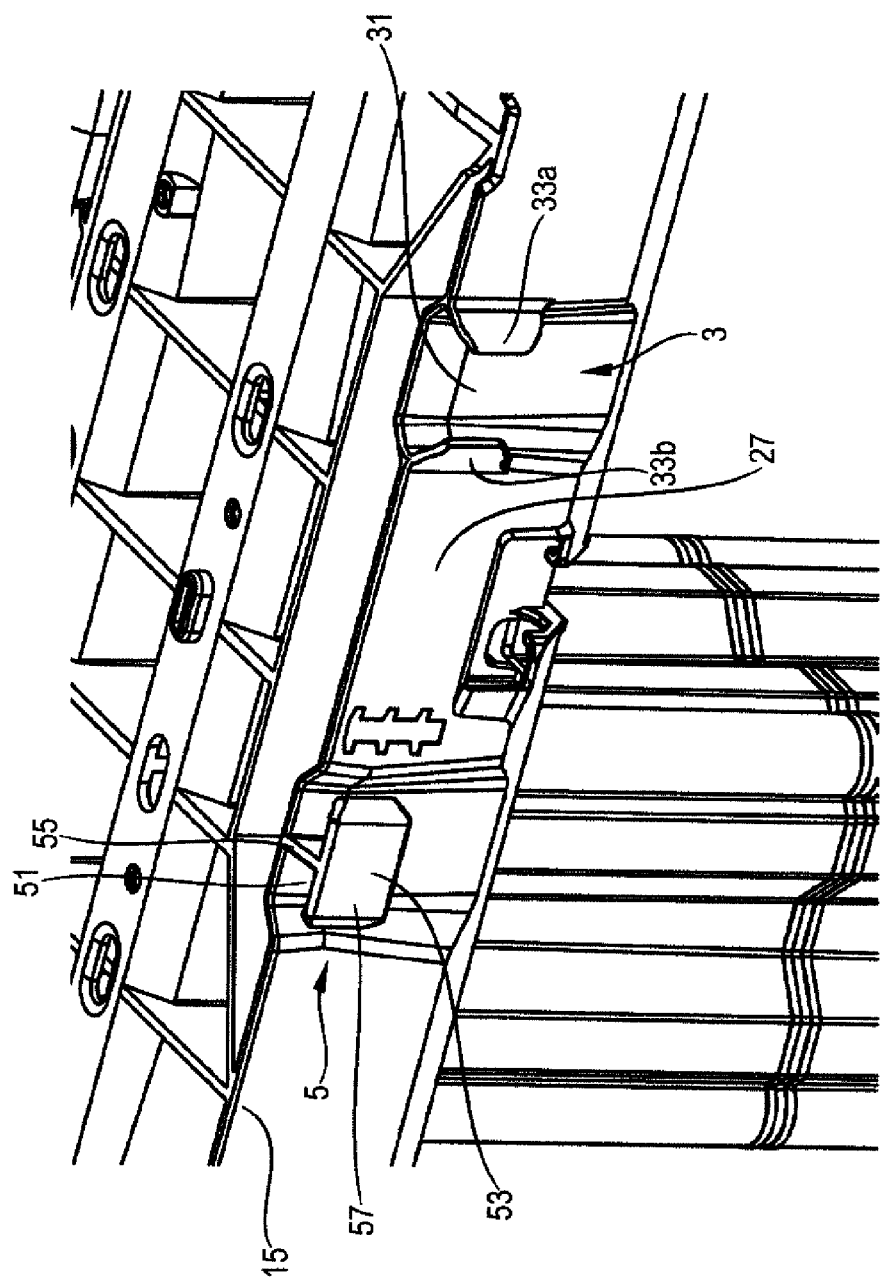
FIG. 7 shows an integrated male connector and an integrated female connector disposed as a pair of connectors in an edge region of a plastic infiltration unit according to an embodiment of the invention.
Figure 8:
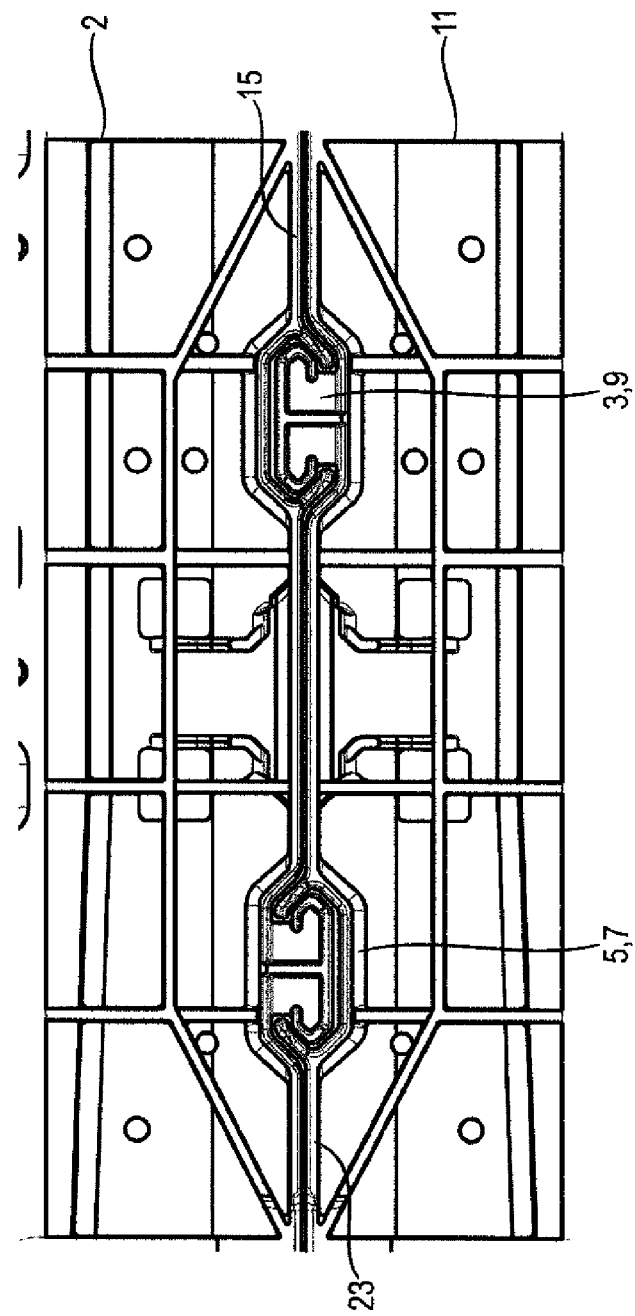
FIG. 8 shows an integrated male connector and an integrated female connector disposed as a pair of connectors in an edge region of a plastic infiltration unit in an installed arrangement, where the pair of connectors of FIG. 7 are connected to a respective corresponding pair of connectors on a further plastic infiltration unit, according to an embodiment of the invention.

In one embodiment, the plastic infiltration unit comprises a top deck 4 which extends in a plane, for example, the xy plane, shown in the Figures. A top deck extending in the xy plane further has a thickness extending in the z-direction, where the connectors are located. The plastic infiltration unit further comprises at least one pillar 6 extending from the top deck for supporting the top deck 4. The top deck 4 is provided with at least one integrated connector 3, 5. The at least one connector is integrally formed in the top deck 4 of the plastic infiltration unit 2, as shown in FIGS. 1 to 7). The at least one integrated connector 3, 5 is arranged to connect the plastic infiltration unit 2 with another at least one integrated connector 7 (male connector), 9 (female connector), as shown in FIG. 8, of another plastic infiltration unit 11 in a side by side arrangement, as shown in FIG. 9. The connection is made in such a way that when the feet of the pillars 6 fall into the socket of the plastic infiltration unit below, one of the integrated connectors slides over its counterpart and engages by itself. One of the interconnectors may be in the form of a hook and its counterpart may be in the form of a groove into which the hook engages. The hook may be a flange of part of the female connector and the groove may be a part of the male connector. The hook extends beyond the surface of the top deck 4. The groove is formed as a recess in the top deck 4. By providing integrated connectors, ease of positioning and connection are made possible by the provision of, for example, grooves and hooks on the side wall of the top deck 4, which interact with each other to form a connection.

Although "male" and "female" connectors are hereindescribed, it will be appreciated that the "male" connector may include, for example, a groove, which may in isolation be considered as a "female" connecting part and the "female" connector may include, for example, a hook, which may in isolation, be considered as a "male" connecting part.

In one embodiment, the top deck 4 has a perimeter 13 extending around the outer edge of the top deck 4, as shown in FIGS. 1 to 4. The perimeter 13 of the top deck 4 comprises a plurality of edge regions 15, 17, 19, 21 including a plurality of edges 15, 17, 19, 21, respectively, as shown in FIGS. 1 to 4. At least one of the plurality of edge regions 15 is arranged to come into alignment with at least one edge region 23 of the another plastic infiltration unit 11, as shown in FIG. 8. The at least one edge 15, 23 of the plastic infiltration unit 2 and the another (second) plastic infiltration unit 11 is provided with at least one connector 3,5, and 7, 9, respectively. In particular, the (first) plastic infiltration unit 2 is provided with a pair of connectors 3, 5. The another (second) plastic infiltration unit is provided with a pair of connectors 7 and 9 (see FIG. 8). The at least one connector 3, 5 of the (first) plastic infiltration unit 2 is arranged to connect with the at least one connector 7, 9 of the another (second) plastic infiltration unit 11. In particular, the top deck 4 may comprise a plurality of edge regions 15, 17, 19 and 21. Each of the plurality of edge regions 15, 17, 19, 21 may be provided with at least one connector 3, 5. The edge regions are joined to each other by a plurality of corner regions 25.

Figure 10:
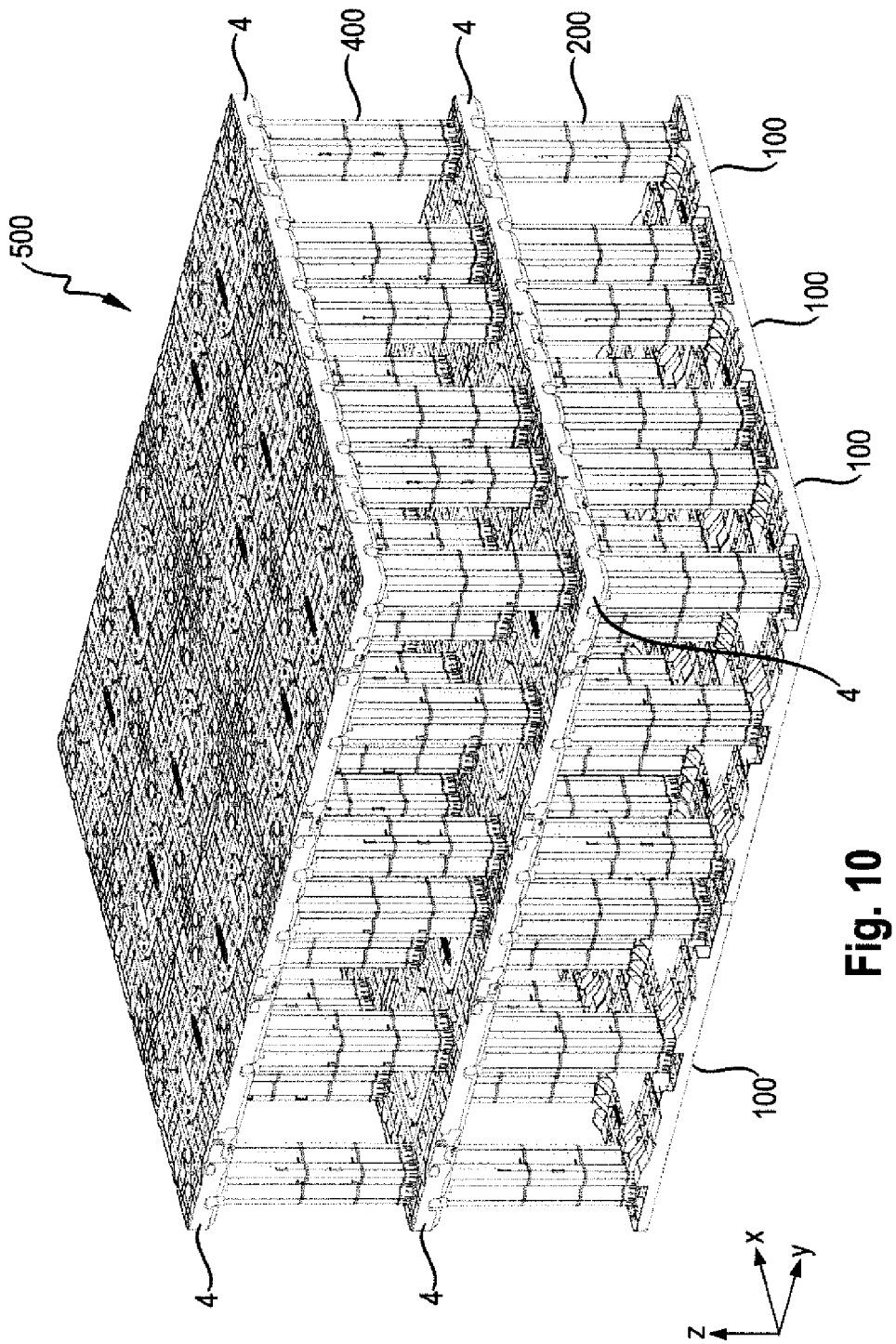
FIG. 10 shows a 3 dimensional array of plastic infiltration units connected together in accordance with an embodiment of the invention.

In the embodiments shown, the top deck 4 in the xy plane is quadrilateral, preferably, rectangular. The invention is not limited in this respect. In the xy plane, the top deck 4 may have any form which either alone, or with other complementary shapes tessellate. For example, triangular, square, hexagonal, octagonal with quadrilateral complementary top decks, etc. For example, FIG. 9 shows a 2 dimensional array of plastic infiltration units connected together in accordance with an embodiment of the invention. In the embodiment shown in FIG. 9, rectangular shaped top decks 4 fit together (tessellate) to form the two dimensional array arranged in a single layer. As seen in FIG. 10, one or more layers may be stacked upon each other to form a three dimensional array of plastic infiltration units.

In one embodiment, the top deck 4 comprises a plurality of edge regions 15, 17, 19, 21. Each of the plurality of edge regions are provided with a pair of connectors 3, 5. In particular, the at least one connector is at least one of a female and a male connector 3, 5. The female connector 3 and the male connector 5 are arranged to be connectable with each other. For example, the female connector 3 of a first plastic infiltration unit 2 is connectable with a male connector 9 of a second (or yet further) plastic infiltration unit 11. Similarly, a male connector 5 of a first plastic infiltration unit 2 is connectable with a female connector 7 of a second (or yet further) plastic infiltration unit 11. In other words, the at least one of a female and a male connector 3, 5 is arranged to connect with at least one of a male and a female connector 9, 7, respectively.

In one embodiment, the plurality of edge regions 15, 17, 19, 21 comprises at least one pair of opposing edge regions. In the embodiments shown, in particular, in FIGS. 1 to 4, the pair of opposing edge regions correspond to edge regions 15 and 17 extending in the y direction and edge regions 19 and 21 extending in the x direction. In particular, the pair of opposing edge regions 15, 17, 19 and 21 comprise a first opposing edge region 15, 19 and second opposing edge region 17, 21. In the embodiments shown, if a female connector 3 is provided at a location on the first opposing edge region 15, 19, a male connector 5 is provided at the same corresponding location on the second opposing edge region 17, 21, and vice versa. For example, if a male connector 5 is provided at a location on the first opposing edge region 15, 19, a female connector 3 is provided at the same corresponding location on the second opposing edge region 17, 21. In this way, when the plastic infiltration unit 2 is arranged side by side with the another (second) plastic infiltration unit 11 having the same arrangement of integrated connectors 3, 4 as the plastic infiltration unit 2, the plastic infiltration unit 2 is connectable with the another plastic infiltration unit 11. In particular, the first opposing edge region 15, 19 of the plastic infiltration unit 2 is brought into alignment with the second opposing edge region 17, 21 of the another (second) plastic infiltration unit 11, the plastic infiltration unit 2 connects with the another (second) plastic infiltration unit 11. Two plastic infiltration units in a connected arrangement are shown in FIG. 8.

In particular, as shown in FIGS. 1 to 4, the top deck 4 may be a quadrilateral construction extending in a first direction (y) and a second direction (x). The top deck 4 may, have a thickness extending in a third direction (z). The first, second and third directions (y, x, z) are different from one another. The perimeter 13 of the quadrilateral construction comprises two pairs of opposing edge regions: a first pair of opposing edge regions 15, 17 comprising a first opposing edge region 15 and a second opposing edge region 17. The first and second opposing edge regions are opposed with respect to each another. The perimeter 13 further comprises a second pair of opposing edge regions 19, 21 comprising a third opposing edge region 19 and fourth opposing edge region 21. The third and fourth opposing edge regions are opposed with respect to each other. The first pair of opposing edge regions 15, 17 extend in the first direction (y) and the second pair of opposing edge regions 19, 21 extend in the second direction (x). Thus, in one embodiment, the first pair of opposing edge regions 15, 17 are perpendicular to the second pair of opposing edge regions 19, 21. If a female connector 3 is provided at a location on at least one of the first and third (opposing) edge region 15, 19, a male connector 5 is provided at the same corresponding location on the at least one of the second and fourth (opposing) edge regions 17, 21, respectively, and vice versa. For example, if a male connector 5 is provided at a location on at least one of the first and third (opposing) edge regions 15, 19, a female connector 3 is provided at the same corresponding location on the at least one of the second and fourth (opposing) edge regions, respectively. In this way, when the plastic infiltration unit 2 is arranged side by side with the another (second) plastic infiltration unit 11 having the same arrangement of integrated connectors as the plastic infiltration unit, when at least one of the first and second opposing edge regions 15, 17 of the plastic infiltration unit 2 is brought into alignment with at least one of the first and second opposing edge regions of the another (second) plastic infiltration unit 11, the plastic infiltration unit connects with the another (second) plastic infiltration unit, at the first or second opposing edge region respectively.

Similarly, when at least one of the third and fourth edge regions 19, 21 of the plastic infiltration unit 2 is brought into alignment with at least one of the third and fourth third opposing edge regions of the another (second) plastic infiltration unit 11, the plastic infiltration unit 2 connects with the another (second) plastic infiltration unit 11, at the third or fourth opposing edge regions respectively.

In one embodiment, around the perimeter 13 of the top deck 4 in the plurality of edge regions 15, 17, 19, 21 at least one connector 3, 5 is arranged on each edge region 15, 17, 19, 21 alternating around the perimeter 13 between a male connector 5 and a female connector 3 (see in particular, FIGS. 1 and 4). In particular, the connectors 3,5 are arranged so that each edge region 15, 17, 19, 21 is connectable with a plurality of other edge regions of a plurality of other plastic infiltration units 11, respectively.

In one embodiment, at least one pair of connectors 3, 5 are arranged around the perimeter 13 of the top deck 4 in the edge region alternating between a male connector 5 and a female connector 3 around the perimeter 13. In this way, an arrangement is achieved whereby any one plastic infiltration unit is connectable with any other similarly constructed plastic infiltration unit.

In a further preferable embodiment, the first to fourth edge regions 15, 17, 19, 21 are provided with at least one pair of integrated connectors 3, 5, the at least one pair of integrated connectors comprising a female connector 3 and a male connector 5. In this way, the orientation of a plurality of similarly constructed plastic infiltration units is not critical when assembling a plurality of plastic infiltration units together. In particular, the each plastic infiltration unit can simply be assembled to another plastic infiltration unit regardless of the orientation in the xy plane of the plastic infiltration units. This saves time and installation costs.

In one embodiment, as seen in FIGS. 1 to 4, the first and second edge regions 15, 17 are provided with two pairs of integrated connectors 3, 5. In this way, the stability of the connection of the relatively long first and second edge regions 15, 17 is improved. In the embodiments shown in FIGS. 1 to 4 the first and second edge regions are longer in the y direction than the third and fourth edge regions in the x direction. In one embodiment, the relatively short third and fourth edge regions 19, 21 may be provided with one pair of integrated connectors 3, 5. The top deck 4 comprises a side wall 27 (see FIGS. 1 to 7) having a thickness in the third (z) direction. The side wall 27 extends around the perimeter 13 of the top deck 4. The at least one edge region 15, 17, 19, 21 includes the side wall 27. As described in more detail hereinbelow, the integrated connectors 3, 5 are formed in the side wall 27.

Figure 5:
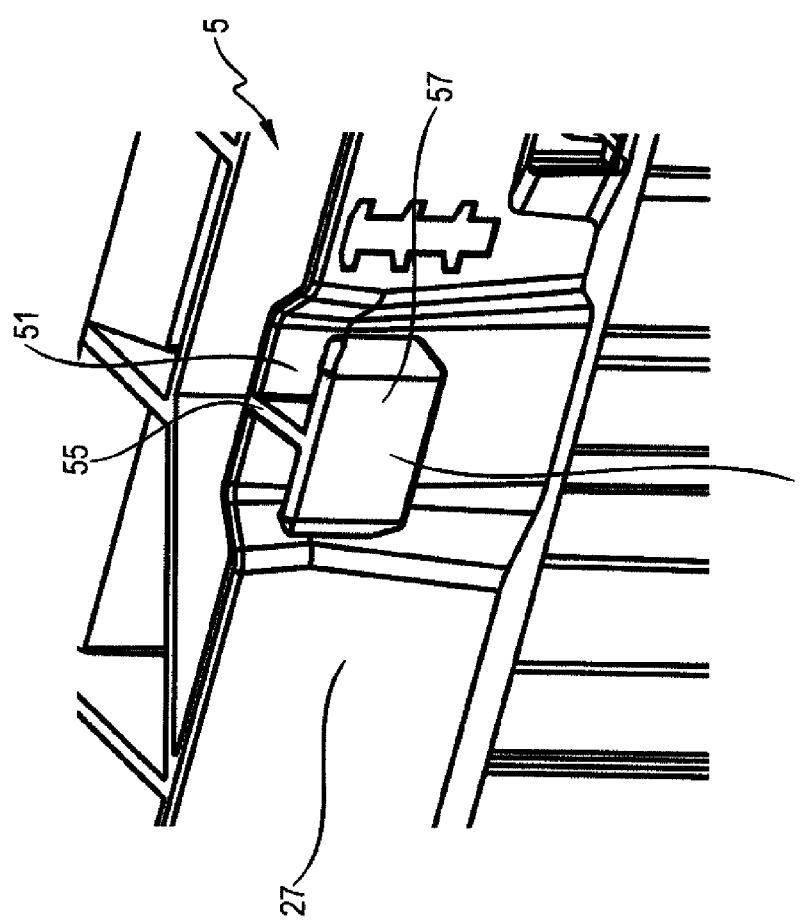
FIG. 5 shows an integrated male connector according to an embodiment of the invention.

FIG. 5 shows an integrated male connector according to an embodiment of the invention. FIG. 6 shows an integrated female connector according to an embodiment of the invention. FIG. 7 shows an integrated male connector and an integrated female connector disposed as a pair of connectors in an edge region of a plastic infiltration unit according to an embodiment of the invention. FIG. 8 shows an integrated male connector and an integrated female connector disposed as a pair of connectors in an edge region of a plastic infiltration unit in an installed arrangement, where the pair of connectors of FIG. 7 are connected to a respective corresponding pair of connectors on a further plastic infiltration unit, according to an embodiment of the invention.

In one embodiment, with reference to FIGS. 5 to 8, the integrated female connector 3 comprises a recess 31 formed in the side wall 27 for receiving a male connector 5. The integrated female connector 3 further comprises a retaining portion 33 extending beyond the side wall 27 for retaining the male connector 5 received in the recess 31. In one embodiment, the retaining portion 33 comprises two opposing elements 33a, 33b extending towards each other from opposite ends of the recess 31 to define an opening 35 into which a male connector 5 is insertable. The integrated male connector 5 comprises a recess 51 formed in the side wall 27 from which a male element 53 extends. The male element 5 comprises a bar 55 which is dimensioned to pass through the opening 35 of the female connector 3 and a plate 57 disposed at a distal end of the bar 55 which is dimensioned to be received in the recess 31 of the female connector 3 and retained by the retaining portion 33a, 33b once received in the recess 31. In this way, the male connector can be readily fitted into the female connector. Preferably, the male connector 5 is slotted into the female connector 3 in the third direction (z), that is in the direction of the thickness of the top deck 4. In this way, once the plastic infiltration units are aligned, one plastic infiltration unit can drop into place without requiring substantial lifting or manoeuvering by the installer. In other words, the retaining portion 33a, 33b may be considered as a hook which extends beyond the side wall 27 of the top deck 4. Further a groove is formed as the space between the recess 51 and the bar 55 and plate 57. The hook hooks into the groove 51, thus connecting the infiltration units. The hook extends beyond the side surface of the top deck 4, so that when two infiltration units are brought together, they will automatically connect when they are correctly aligned. In fact, by simply moving the units with respect to one another along their sides, the units will connect once they are correctly aligned. It is not necessary for an operator to accurately prealign the units. Thus, an improved ease of use is achieved.

The integrated connectors are further provided on the infiltration units so that they can be connected with respect to one another at 180 degrees or 360 degrees, in other words, two infiltration units may be connected along either of their long ends (along the y direction) or along either of their short ends (along the x direction). Beyond bringing two respective short or long ends (sides) into proximity, it is not necessary to otherwise orient the plastic infiltration units for connection in the xy plane.

When assembling a first layer of a plurality of plastic infiltration units, the first layer is connected to one another by lifting the next unit slightly so that it can unite with its counterpart.

FIG. 9 shows a 2 dimensional array of plastic infiltration units connected together in accordance with an embodiment of the invention. FIG. 10 shows a 3 dimensional array of plastic infiltration units connected together in accordance with an embodiment of the invention.

According to one embodiment of the invention, a plurality of plastic infiltration units are arranged in use to form a 2 dimensional array of plastic infiltration units extending in a plane. In the embodiment shown in FIG. 9, the array extends in the xy plane.

According to a further aspect of the present invention, there is provided a system comprising a first plurality of plastic infiltration units connectable with one another to form a first 2 dimensional array 200 extending in a first plane (see FIG. 9). The first plurality of plastic infiltration units 200 forms a first layer of units. The system further comprises a second plurality of plastic infiltration units, connectable with one another to form a second 2 dimensional array 400 extending in a second plane. In the embodiment shown in FIG. 10, the first plane extends in the xy direction. The second plane extends in the xy direction and is displaced in the z direction with respect to the first plane. The second plurality of plastic infiltration units forms a second layer of units 400. Further, the second layer of units 400 is stackable on the first layer of units 200 to form a 3 dimensional array 500.

In a further embodiment the system comprises a plurality of plastic base plates 100. Each of the plurality of plastic base plates comprises at least one socket 102 for receiving the at least one pillar 6 of each of the first plurality of plastic infiltration units 200, respectively. The at least one pillar 6 of each of the first plurality of plastic infiltration units 200 are insertable into the at least one socket 102 of each of the plurality of plastic base plates 100, respectively. In this way, a two dimensional array can be installed on a plastic base plate.

The at least one pillar 6 may extend from the top deck 4 in a longitudinal direction 12 (FIG. 1). The at least one pillar has a proximal end 14 and a distal end 16 with respect to the top deck 4. The pillar 6 further comprises an intermediate portion 18 located between the proximal end 14 and the distal end 16 (see FIG. 1).

The proximal end 14 may comprise a socket 20 (see FIG. 4) and the distal end 16 may comprise a foot 22 (see FIGS. 1 to 3). The distal end 16 is configured so that in use, it may be inserted into a socket of a lower unit. FIG. 10 shows a stack of two layers. In a further embodiment, the top deck 4 of each of the first plurality of plastic infiltration units 200 comprises at least one socket 20 (see FIG. 4) for receiving the at least one pillar 6 of each of the second plurality of plastic infiltration units 400, respectively. The at least one pillar 6 of each of the second plurality of plastic infiltration units 400 are insertable in to the at least one socket 20 of each of the first plurality of plastic infiltration units 200, respectively. Further, the at least one pillar 6 may comprise a foot 22 (see FIGS. 1 to 3) located at a distal portion of the pillar 6. The foot 22 is insertable in the at least one respective socket 20. Preferably, the height of the connectors in the third (z) direction is approximately the same or slightly smaller than the length of the foot 22 in the third direction. In this way, when the at least one foot 22 is inserted into the at least one socket 20, the arrangement of the female and the corresponding male connectors 3, 5, allows an upper plastic infiltration unit 400 to drop down into position on a lower plastic infiltration unit 200. In this way, a yet further simplified and efficient installation is achieved.

The arrangements of plastic infiltration units are not limited to those shown in the Figures. In particular, it is envisaged that a plurality of layers may be built up upon each other. The number of infiltration units which can be stacked on one another is not limited to the number shown in Figures. It is envisaged that several infiltration units may be stacked on each other depending on the required circumstances of the infiltration or attenuation. The first layer 200 is the lowest layer and the higher numbered layers are layered on top of each other, wherein the nth layer is an uppermost layer. Typically, the layers are arranged on top of one another, the lowest layer is formed first, the upper layers are formed next and the uppermost layer is formed last. However, whilst one layer is being formed, it is also envisaged that further units may be stacked on parts of the one layer that is already formed. The invention is not limited in terms of the order in which a 3 dimensional array is formed.

In the stack, the at least one pillar 6 of the at least one plastic infiltration unit is oriented in a downward direction (z direction). Further, the top deck 4 of a second plastic infiltration unit in a first layer 200 forms a base plate of a plastic infiltration unit arranged above the first plastic infiltration unit in the second layer 400 in the stack.

According to an embodiment of the present invention, there is provided an assembly comprising at least two plastic infiltration units, including a first plastic infiltration unit and a second plastic infiltration unit, wherein each plastic infiltration unit comprises a top deck which extends in a plane, at least one pillar extending from the top deck for supporting the top deck, wherein the top deck is provided with at least one integrated connector arranged to connect the first plastic infiltration unit with another at least one integrated connector of the second plastic infiltration unit in a side by side arrangement.

It is of course clear that the expression "the top deck is provided with at least one integrated connector" is to be understood as embracing or alternatively formulated as the following expressions, and that the following expressions may be interchangeable with the expression "the top deck is provided with at least one integrated connector": that the at least one integrated connector is provided within the boundaries of the top deck.

In one embodiment, the top deck is provided with at least one integrated connector, wherein the at least one integrated connector does not extend beyond an upper surface of at least one of the top deck and the infiltration unit. Further, the at least one integrated connector may be flush with an upper surface of the top deck.

It is of course clear that the expression "produced in one piece" is to be understood as embracing or alternatively formulated as the following expressions, and that the following expressions may be interchangeable with the expression "produced in one piece": that the top deck and the at least one pillar are at least one of monolithic, uniform and/or integral, alternatively, that the infiltration unit is free from at least one of joins, seams, and/or interfaces, further alternatively, that the material of the top deck and the material of the pillar are continuous, yet further alternatively, that the top deck and the pillar are integrally connected, and yet further alternatively, that the top deck and the pillar are free from at least one of joins, seams, and/or interfaces.

The invention is not limited to the embodiments shown and described above.

The invention claimed is:

1. A plastic infiltration unit comprising:
   a top deck which extends in a plane,
   at least one pillar extending from the top deck for supporting the top deck,
   wherein the top deck is provided with at least one integrated connector arranged to connect the plastic infiltration unit with another at least one integrated connector of another plastic infiltration unit in a side by side arrangement, wherein the at least one integrated connector of the plastic infiltration unit comprises a male connector and wherein the at least one integrated connector of the another plastic infiltration unit comprises a female connector, wherein the male connector comprises a bar dimensioned to pass through an opening of the female connector and a plate disposed at a distal end of the bar, wherein at least one end of the plate forms a curved, hook-like end.

2. The plastic infiltration unit according to claim 1, wherein a perimeter of the top deck comprises a plurality of edge regions including a plurality of edges, respectively, wherein at least one of the plurality of edge regions is arranged to come into alignment with at least one edge region of the another plastic infiltration unit, wherein each of the at least one edge of the plastic infiltration unit and the another plastic infiltration unit is provided with at least one integrated connector, respectively.

3. The plastic infiltration unit according to claim 1, wherein the top deck comprises a plurality of edge regions, wherein each of the plurality of edge regions is provided with at least one integrated connector.

4. The plastic infiltration unit according to claim 3, wherein around a perimeter of the top deck in the plurality of edge regions at least one integrated connector is arranged on each edge region alternating around the perimeter between the male connector and a female connector.

5. The plastic infiltration unit according to claim 4, wherein the at least one integrated connector is arranged so that each edge region is connectable with a plurality of other edge regions of a plurality of other plastic infiltration units, respectively.

6. The plastic infiltration unit according to claim 3, wherein at least one pair of integrated connectors is arranged around a perimeter of the top deck in the plurality of edge regions alternating between the male connector and a female connector around the perimeter.

7. The plastic infiltration unit according to claim 1, wherein the top deck comprises a plurality of edge regions, wherein each of the plurality of edge regions is provided with a pair of integrated connectors.

8. The plastic infiltration unit according to claim 7, wherein the plurality of edge regions comprises at least one pair of opposing edge regions, the pair of opposing edge regions comprising a first opposing edge region and second opposing edge region, wherein if a female connector is provided at a location on the first opposing edge region, the male connector is provided at the same corresponding location on the second opposing edge region, and vice versa, so that when the plastic infiltration unit is arranged side by side with the another plastic infiltration unit having the same arrangement of integrated connectors as the plastic infiltration unit, and when the first opposing edge region of the plastic infiltration unit is brought into alignment with the second opposing edge region of the another plastic infiltration unit, the plastic infiltration unit connects with the another plastic infiltration unit.

9. The plastic infiltration unit according to claim 1, wherein the at least one integrated connector of the plastic infiltration unit further comprises a female connector and wherein the at least one integrated connector of the another plastic infiltration unit further comprises a male connector, wherein the male connector of the another plastic infiltration unit comprises a bar dimensioned to pass through an opening of the female connector of the plastic infiltration unit and a plate disposed at a distal end of the bar, wherein at least one end of the plate forms a hook-like end, wherein the female connector of the plastic infiltration unit comprises a hook constructed and arranged to engage the hook-like end of the male connector of the another plastic infiltration unit.

10. The plastic infiltration unit according to claim 9, wherein the female connector of the plastic infiltration unit comprises a recess formed in the top deck for receiving the male connector of the another plastic infiltration unit and wherein the female connector of the plastic infiltration unit further comprises a retaining portion extending beyond the top deck for retaining the male connector of the another plastic infiltration unit received in the recess.

11. The plastic infiltration unit according to claim 10, wherein the retaining portion comprises two opposing elements extending towards each other from opposite ends of the recess to define the opening of the female connector of the plastic infiltration unit into which the male connector of the another plastic infiltration unit is insertable.

12. The plastic infiltration unit according to claim 10, wherein the male connector of the plastic infiltration unit comprises a recess formed in the top deck from which the bar extends, wherein the plate is dimensioned to be received in the recess of the female connector of the another plastic infiltration unit and retained by the retaining portion once received in the recess.

13. The plastic infiltration unit according to claim 10, wherein the male connector of the plastic infiltration unit is slotted into the female connector of the another plastic infiltration unit in a direction of a thickness of the top deck.

14. The plastic infiltration unit according to claim 1, wherein the top deck is a quadrilateral construction extending in a first direction (y) and a second direction (x), and having a thickness extending in a third direction (z), the first, second and third directions being different from one another, wherein a perimeter of the quadrilateral construction comprises two pairs of opposing edge regions: a first pair of opposing edge regions comprising a first and a second opposing edge region and a second pair of opposing edge regions comprising a third and fourth opposing edge region, respectively, wherein the first pair of opposing edge regions extend in the first direction and the second pair of opposing edge regions extend in the second direction, wherein if a female connector is provided at a location on at least one of the first and third opposing edge regions, the male connector is provided at the same corresponding location on the second and fourth opposing edge regions, respectively, and vice versa, so that when the plastic infiltration unit is arranged side by side with the another plastic infiltration unit having the same arrangement of integrated connectors as the plastic infiltration unit, and when at least one of the first and second opposing edge regions of the plastic infiltration unit is brought into alignment with at least one of the first and second opposing edge regions of the another plastic infiltration unit, the plastic infiltration unit connects with the another plastic infiltration unit, at the first or second opposing edge region respectively.

15. The plastic infiltration unit according to claim 14, wherein when at least one of the second and fourth opposing edge regions of the plastic infiltration unit is brought into alignment with at least one of the second and fourth third opposing edge regions of the another plastic infiltration unit, the plastic infiltration unit connects with the another plastic infiltration unit, at the second and fourth or fourth and second opposing edge regions respectively.

16. The plastic infiltration unit according to claim 15, wherein the first, second, third, and fourth edge regions are provided with at least one pair of integrated connectors, the at least one pair of integrated connectors comprising the female connector and the male connector.

17. The plastic infiltration unit according to claim 15, wherein the first and second edge regions are provided with two pairs of integrated connectors.

18. The plastic infiltration unit according to claim 15, wherein the third and fourth edge regions are provided with one pair of integrated connectors.

19. The plastic infiltration unit according to claim 1, wherein the top deck comprises a side wall having a thickness in a third direction, the side wall extending around a perimeter of the top deck, wherein the at least one edge region includes the side wall.

20. The plastic infiltration unit according to claim 1, wherein a longitudinal direction of the at least one pillar is substantially perpendicular to the plane of the deck.

21. A plurality of plastic infiltration units according to claim 1, arranged in use to form a two-dimensional array of plastic infiltration units extending in a plane.

22. A system comprising a first plurality of plastic infiltration units according to claim 1, connectable with one another to form a first two-dimensional array extending in a first plane, the first plurality of plastic infiltration units forming a first layer of units, the system further comprising a second plurality of plastic infiltration units according to claim 1, connectable with one another to form a second two-dimensional array extending in a second plane, the second plurality of plastic infiltration units forming a second layer of units, wherein the second layer of units is stackable on the first layer of units to form a three-dimensional array.

23. The system according to claim 22, further comprising a plurality of plastic base plates, each comprising at least one socket for receiving the at least one pillar of each of the first plurality of plastic infiltration units, respectively, wherein the at least one pillar of each of the first plurality of plastic infiltration units is insertable into the at least one socket of each of the plurality of plastic base plates, respectively.

24. The system according to claim 23, wherein the top deck of each of the first plurality of plastic infiltration units comprises at least one socket for receiving the at least one pillar of each of the second plurality of plastic infiltration units, respectively, wherein the at least one pillar of each of the second plurality of plastic infiltration units is insertable in to the at least one socket of each of the first plurality of plastic infiltration units, respectively.

25. The system according to claim 24, wherein the at least one pillar comprises a foot located at a distal portion of the pillar, wherein the foot is insertable in the at least one respective socket.

26. The system according to claim 25, wherein the height of the at least one socket in the direction of the second plane is approximately the same or smaller than the length of the foot in the direction of the second plane, so that when the at least one foot is inserted into the at least one socket, the arrangement of the at least one integrated connector allows an upper plastic infiltration unit to drop down into position on a lower plastic infiltration unit.

27. An assembly comprising at least two plastic infiltration units, including a first plastic infiltration unit and a second plastic infiltration unit, wherein each plastic infiltration unit comprises a top deck which extends in a plane, at least one pillar extending from the top deck for supporting the top deck, wherein the top deck is provided with at least one integrated connector arranged to connect the first plastic infiltration unit with another at least one integrated connector of the second plastic infiltration unit in a side by side arrangement, wherein the at least one integrated connector of the first plastic infiltration unit comprises a male connector and wherein the at least one integrated connector of the second plastic infiltration unit comprises a female connector, wherein the male connector comprises a bar dimensioned to pass through an opening of the female connector and a plate disposed at a distal end of the bar, wherein at least one end of the plate forms a curved, hook-like end.

* * * * *